(12) United States Patent
Adibi (10) Patent No.: US 10,304,350 B1
(45) Date of Patent: May 28, 2019

(54) WEB-BASED APPLICATION FOR MONITORING STUDENTS PREPARING FOR TIMED WRITING EXAMINATIONS

(71) Applicant: JurisLabs, LLC, Mountain View, CA (US)

(72) Inventor: Amir Vicente Adibi, Oakland, CA (US)

(*) Notice: Subject to any disclaimer, the term of this patent is extended or adjusted under 35 U.S.C. 154(b) by 0 days.

(21) Appl. No.: 15/626,514

(22) Filed: Jun. 19, 2017

Related U.S. Application Data (63) Continuation of application No. 14/218,722, filed on Mar. 18, 2014.

(60) Provisional application No. 61/800,271, filed on Mar. 15, 2013.

(51) Int. Cl.
*G09B 7/02* (2006.01)

(52) U.S. Cl.
CPC ..................... *G09B 7/02* (2013.01)

(58) Field of Classification Search
CPC ....................................................... G09B 7/02
USPC ....................................................... 434/362
See application file for complete search history.

(56) References Cited

U.S. PATENT DOCUMENTS

| | | | |
|---|---|---|---|
| 2008/0096178 A1* | 4/2008 | Rogers | G06Q 50/205 434/362 |
| 2014/0234810 A1* | 8/2014 | Flor | G09B 7/02 434/169 |

* cited by examiner

*Primary Examiner* — Thomas J Hong
(74) *Attorney, Agent, or Firm* — Amir V. Adibi; Quynh M. Chen (57) ABSTRACT

A webpage is presented to a student upon beginning an examination. Text of the question is provided to the student on the upper part of the page. The student is shown a timer that shows how much time has elapsed since the student has begun taking the examination. The webpage permits the student to hide the timer or to show how much time is remaining. The student begins typing the answer in the text box provided. As the student types the answer in the text box, the text is communicated asynchronously request to a web application. The web application is executing on a web application server and stores the received answer of the student in a database at various time intervals. For example, every minute, the web-application stores the answer of the student. An instructor is able to see exactly how issues, rules, and facts are discussed throughout the exam.

5 Claims, 10 Drawing Sheets

BAR EXAMINATION REVIEW WRITING SYSTEM

RENDERING AN EXAMINATION WEBPAGE AND COMMUNICATING
ANSWER TEXT TO A SERVER AT TIME PERIOD INTERVALS

WEB-BASED APPLICATION FOR MONITORING STUDENTS PREPARING FOR TIMED WRITING EXAMINATIONS

CROSS-REFERENCE TO RELATED APPLICATIONS

This application is a continuation of, and claims priority under 35 U.S.C. § 120 from, nonprovisional U.S. patent application Ser. No. 14/218,722 entitled "Web-Based Application For Monitoring Students Preparing For Timed Writing Examinations," filed Mar. 18, 2014. Application Ser. No. 14/218,722 in turn claims the benefit under 35 U.S.C. § 119 from provisional U.S. patent application Ser. No. 61/800,271, entitled "System For Tracking And Improving Examination Writing," filed on Mar. 15, 2013. The entire subject matter of the aforementioned patent documents is incorporated herein by reference.

TECHNICAL FIELD

The described embodiments relate generally to web-based educational tools.

BACKGROUND INFORMATION

Students preparing for timed writing exams, such as a bar examination, typically prepare by writing essays. A growing percentage of students preparing have switched from writing exams by hand to typing exams on a computer. Most students preparing for a bar examination take a review course with instructors that teach a student how to prepare. Preparing involves taking essay practice exams on their computers using a standard word processing program. The student types for the allotted time and then submits their exam answer. The instructors are limited in their ability to assess a student answer because they can only see the final exam answer. A more robust solution is desired.

SUMMARY

An HTML page is presented to a student upon beginning an examination. Text of the question is provided to the student on the upper part of the page. The student is shown a timer that shows how much time has elapsed since the student has begun taking the examination. The HTML page permits the student to hide the timer or to show how much time is remaining. The student begins typing the answer in the text box provided. As the student types the answer in the text box, the text is communicated via an asynchronous POST request to the web application. The web application is executing on a web application server, typically a PaaS system or a cloud based system. The answer of the student is stored in a database at various intervals. For example, every minute, the application stores the answer of the student. When the student is finished typing the answer, the student clicks a button to end the exam.

Another HTML page is presented to the student in a training mode. In this mode, the student is provided with a list of issues on the right side of the screen. The list of issues provide guidance to the student for answering the question. In addition, the student is provided with a list of rules for each potential issue that the student may write about. For example, if the user clicks a rule on the right side of the page, then a drop down text will appear showing the student various rules for writing about the particular issue.

The web application permits an instructor of the student to log onto the webpage and provide questions as well as issues and rules that the student can access. The instructor accesses the question database, the issue database and the rules database via a webpage provided by the web application. In one example, the instructor selects an old bar examination question, for example, July 2002 Essay #1 of the California Bar Examination. The instructor selects various issues that are associated with the essay question, and orders each issue as they should be presented to the student. The instructor then selects and edits the rules for each issue. The instructor then clicks a button that links the question to the student and clicks a submit button. The student then receives an email indicating that the exam is ready to be taken. The student logs onto a webpage, sees the instructor has uploaded an examination, the student clicks take exam and is shown a screen having the issues provided by the instructor. In another example, the student selects the potential issues on their own without an instructor. The student may decide to add rules or edit the rules provided on the rules database.

In accordance with another novel aspect, the student indicates on the webpage which part of the essay corresponds to an Issue, Rule, Analysis or Conclusion. A drop down menu is provided next to each paragraph the student has typed. The student then selects which block of text corresponds to an Issue, Rule, Analysis or Conclusion.

In accordance with another novel aspect, the instructor can view answers for a number of students based on these categories. For example, if the instructor has ten students, then the instructor can view all answers for a particular question, and order them by issue. So the instructor can see all answers pertaining to ISSUE A for a particular question. This provides the instructor ease of grading and reviewing. The instructor can also quickly highlight good passing answers immediately.

In accordance with another novel aspect, grouping each part of answer also allows the student to easily view their past answers in a meaningful way. For example, a student is able to view all Analysis provided when "RULE D" is applied. The student can also see the types of questions that are asked when a certain Rule is involved. The web application also provides for crowd sourcing, whereby good answers will be able to be viewed by other students. For example, a student can view highly rated analysis for a particular issue. This will help a students learning because they can see how certain issues are applied rather than just memorizing the issue or rule.

In accordance with another novel aspect, the instructor is also able to see how the student spends their time during the examination. Typically, a student only has one hour to complete a response to each examination question. Because timing is so critical, knowing exactly how much a student spends on an issue is invaluable. This information is available to the instructor and the student because the answer is saved periodically at set intervals. For example, the student may select to save the answer every minute. Thus the instructor can access the answer as it was typed minute by minute and see where the student was wasting time or struggling.

In accordance with another novel aspect, the web application performs natural language processing to determine whether certain paragraphs are either a rule or an issue. One technique is computing string distance to determine if a paragraph matches a pre-defined rule statement. The web application also computes other statistics such as word count. In addition, the web application also tracks the amount of time the student spends typing each paragraph. This gives a very precise insight to the instructor on how much the student is spending on each issue.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
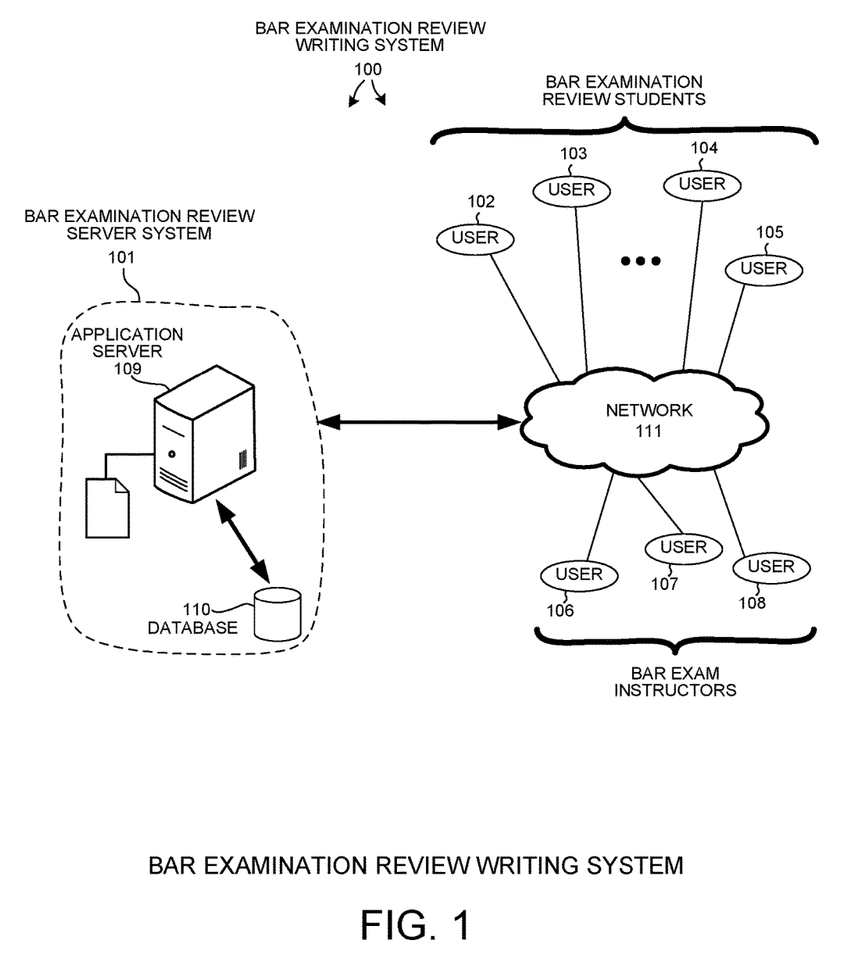
FIG. 1 is a diagram of a bar examination review writing system 100.

FIG. 1 is a diagram of a bar examination review writing system 100. The examination review writing system 100 comprises a bar examination review server system 101, a plurality of users 102-105 corresponding to students and a plurality of users 106-108 corresponding to instructors. The bar examination review server system 101 comprises an application server 109 and a database 110. The users 102-108 communicate with the application server 109 via the network 111 using a network-enabled device. A network-enabled device includes a portable laptop computer, a desktop, a tablet computer, or a mobile communication device. The application server stores a set of processor-executable instructions that form a web-application ("webapp").

In one example, the web-application is a set of javascript instructions that implements the model-view-controller (MVC) design patten. Backend framework is implemented in Node.js using the express.js framework. User accounts are handled using the passport.js library. The front end is implemented using a frontend javascript library such as ExtJS, JQuery, Wijmo, or MooTools. The backend instructions use a templating system to generate the front end views, such as ejs, hogan.js, or jade, and a stylesheet framework such as less or stylus. All the data (examination questions, examination answers, examination configuration information, user profiles, etc.) is stored in a database, such as an SQL database such as MySQL or a nosql database such as mongodb. The web application may use websockets implemented in socket.io to provide communication between the frontend views and the backend models as controlled by the controllers. In another example, the web application is realized in ruby instructions using the Ruby on Rails framework, in python instructions using the Django framework, in Java instructions, or in PHP instructions.

Figure 2:
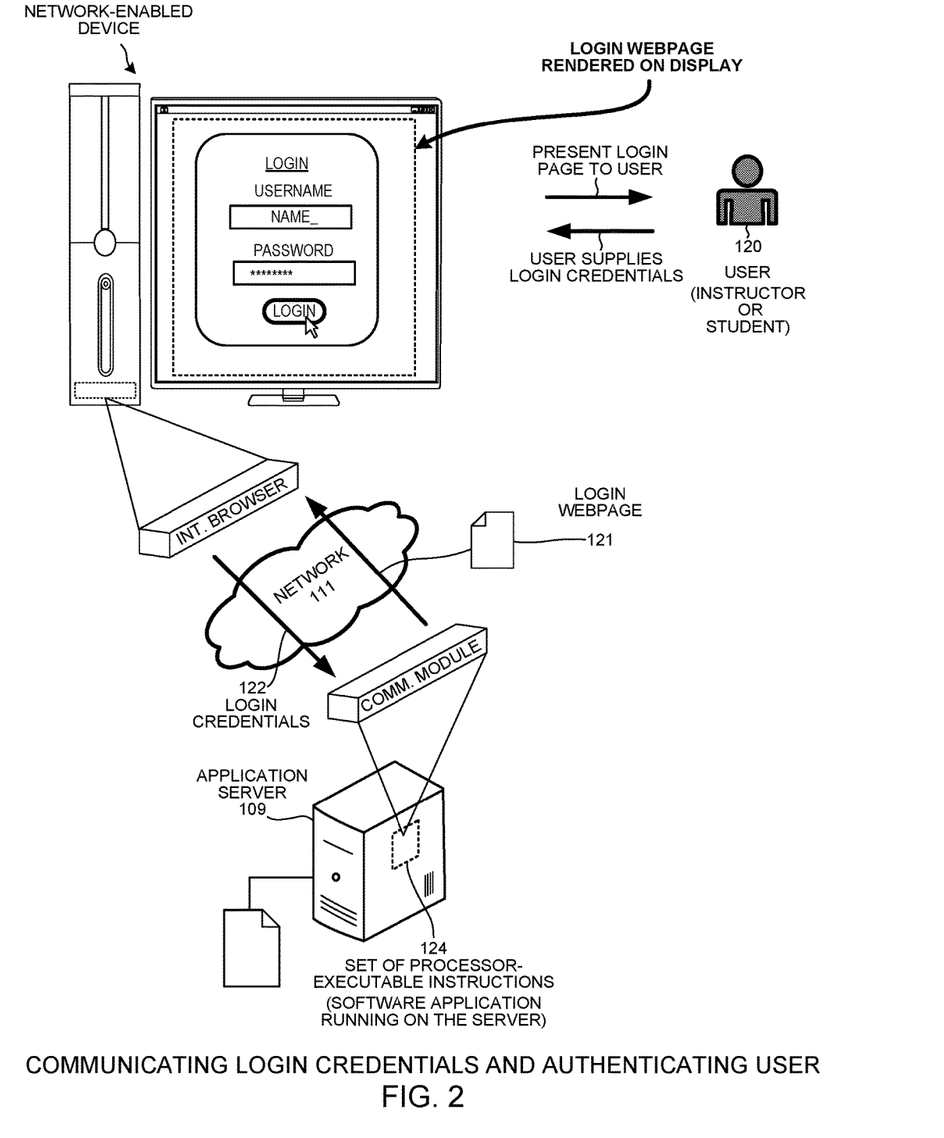
FIG. 2 is a diagram that shows a user 120 logging into the webapp.

FIG. 2 is a diagram that shows a user 120 logging into the web application. The user 120 is an instructor or a student. A login webpage 121 is communicated via the network 111. The user 120 inputs the login credentials 122. The application server uses the credentials to authenticate the user. In one example, the users 106-108 are instructors of a bar review program, such as Barbri or Kaplan. The users 102-105 register for the bar review program and are provided unique login credentials to log into the web application. A separate entity typically manages and maintains the application server 109 and the web application 124, however, the bar review program may also manage the application server 109. In another example, each of the users 106-108 is a private bar examination tutors. The users 102-105 obtain access to the web application 124 via the bar examination tutors 106-108 or through a separate entity that manages and maintains the application server 109 and the web application 124. In yet another example, each of the users 106-108 is a professor at a law school. The law school contracts with a separate entity that manages and maintains the application server 109 and the web application 124 to obtain a set of licenses. Each license includes a login credential that is distributed to an individual student. The professors and students use the web application 124 to assist in preparing the students for the timed essay examinations.

Figure 3:
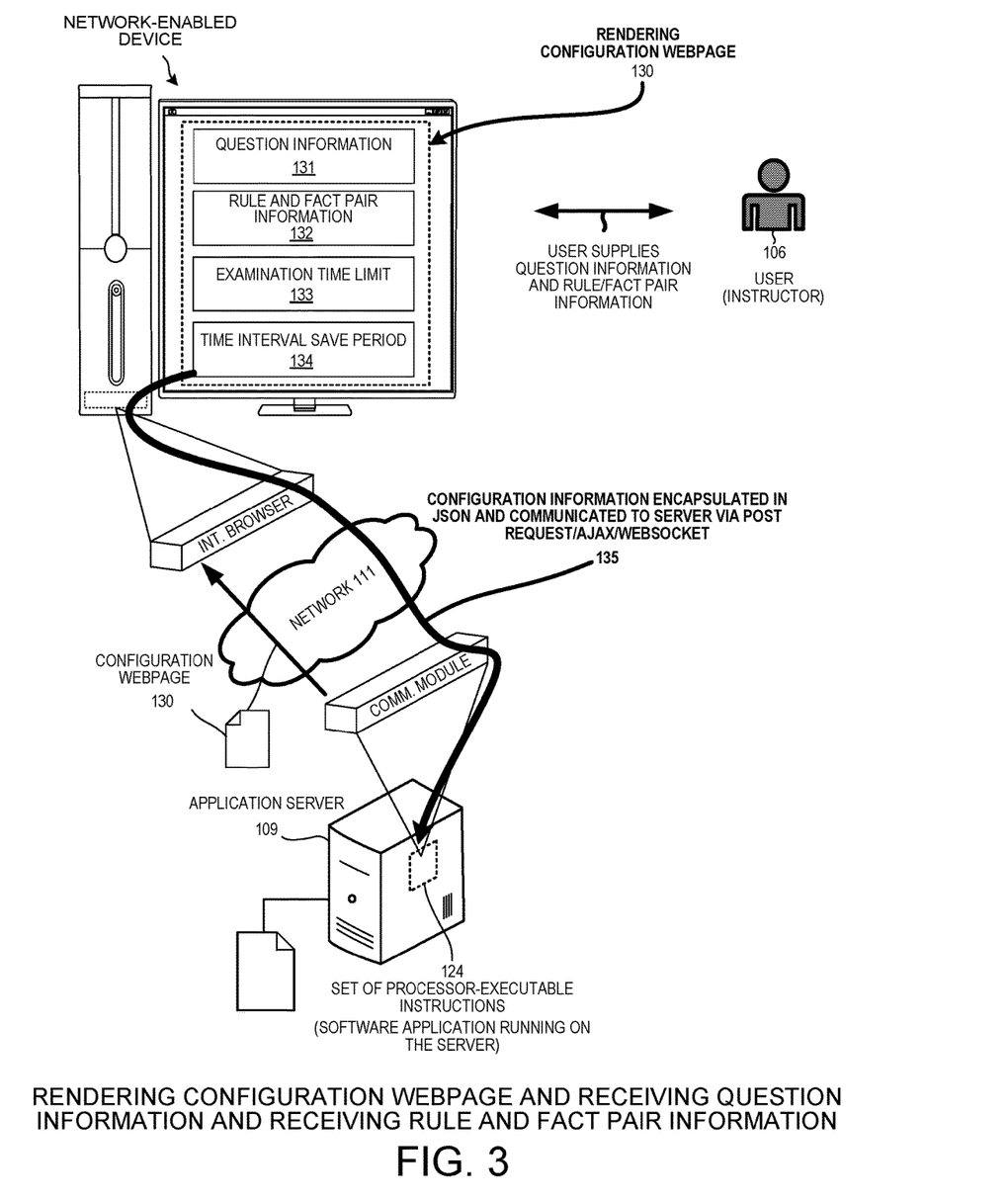
FIG. 3 is a diagram of rendering a configuration webpage 130 on a network-enabled device of the instructor 106.

FIG. 3 is a diagram of rendering a configuration webpage 130 on a network-enabled device of the instructor 106. The webpage 130 includes a plurality of User Interface (UI) components comprising question information UI component 131, rule and fact pair information UI component 132, examination time limit information UI component 133, and time interval period UI component 134. The configuration webpage 130 is supplied by web application 135 executing on the application server 109. Each of the UI components 131-134 rendered on the configuration webpage 130 are used by the instructor 106 to configure an examination. Reference numeral 135 identifies a communication from the configuration webpage 130 to the application server 109. The communication includes the configuration information supplied from the instructor 106 to the webpage 130. The communication is encapsulated in Java Script Object Notation (JSON). In one example, the communication is a POST request that is generated by the configuration webpage 130 in response to an input event, such as clicking a submit button. In another example, the communication is an asynchronous method call that communicates the configuration information in JSON to the application server 109 and is handled by the web application 124. The asynchronous call may be realized in a jquery instruction, such as the $.ajax( ) method. In another example, the communication is a websocket communication. The websocket communication is realized via a socket.io method call, such as a socket.on( ) method call or a socket.emit( ) method call available through the socket.io library.

Figure 4:
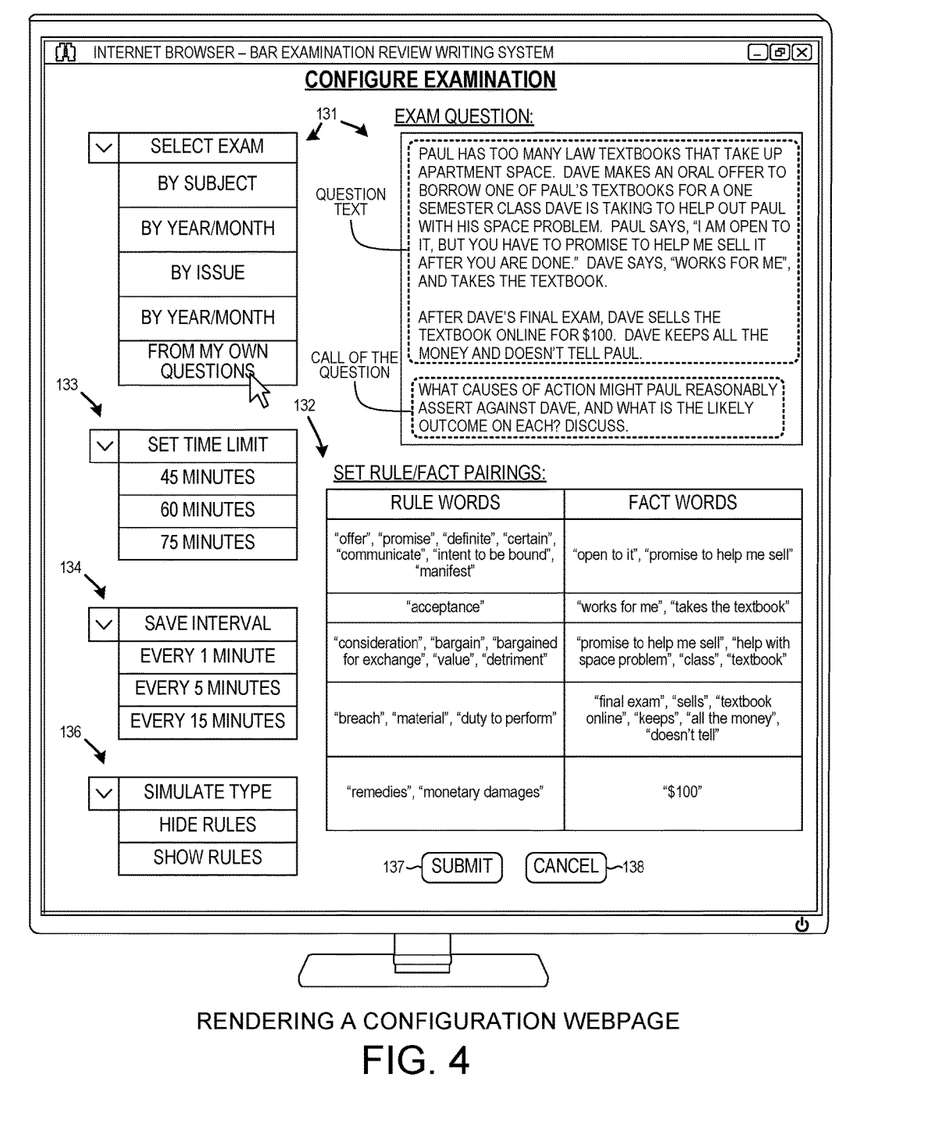
FIG. 4 is a more detailed diagram of the configuration webpage 130.

FIG. 4 is a more detailed diagram of the configuration webpage 130. The instructor 106 supplies rule and fact word pairing information. Each row shown in UI component 132 is editable and allows the instructor 106 to input text. The rule and fact pairings are determined by the instructor 106 given the question selected via UI component 131. The instructor may draw from prior bar exams or draft his/her own question. UI component 134 allows the instructor to indicate how the frequency the student answer is saved. For example, the student answer is to be saved every 1 minute, every 5 minutes or every 15 minutes. In the case of 1 minute, the instructor would have sixty snapshots of the students answer during a typical sixty minute exam period. In the case of 15 minutes, the professor would have only four snapshots of the students answer during the typical sixty minute exam period. UI component 136 allows the instructor to supply a testing mode. The submit button 137 allows the instructor 106 to finish configuring the exam so that it may be taken by students. The cancel button 138 allows the instructor 106 clear the examination configuration information and supply new examination configuration information.

The testing mode is set to a training examination mode or to a simulation examination mode. In the training examination mode, the student is permitted to see the rules during the examination. The student is given all of the rules and is able to focus on the legal analysis rather than having to remember or memorize rule statements. Typically, the rules are provided by the instructor or by the student, but may be provided by a separate entity that provides the black letter law, such as Emanuel law outlines, Kaplan law outlines, or Conviser law outlines. In the simulation examination mode, the student is not permitted to see any rule information. This mode is used to emulate an actual testing scenario in preparation for the bar examination. Typically, no countdown timer is shown in the examination webpage in the simulation examination mode so that the student is able to practice keeping track of time.

Figure 5:
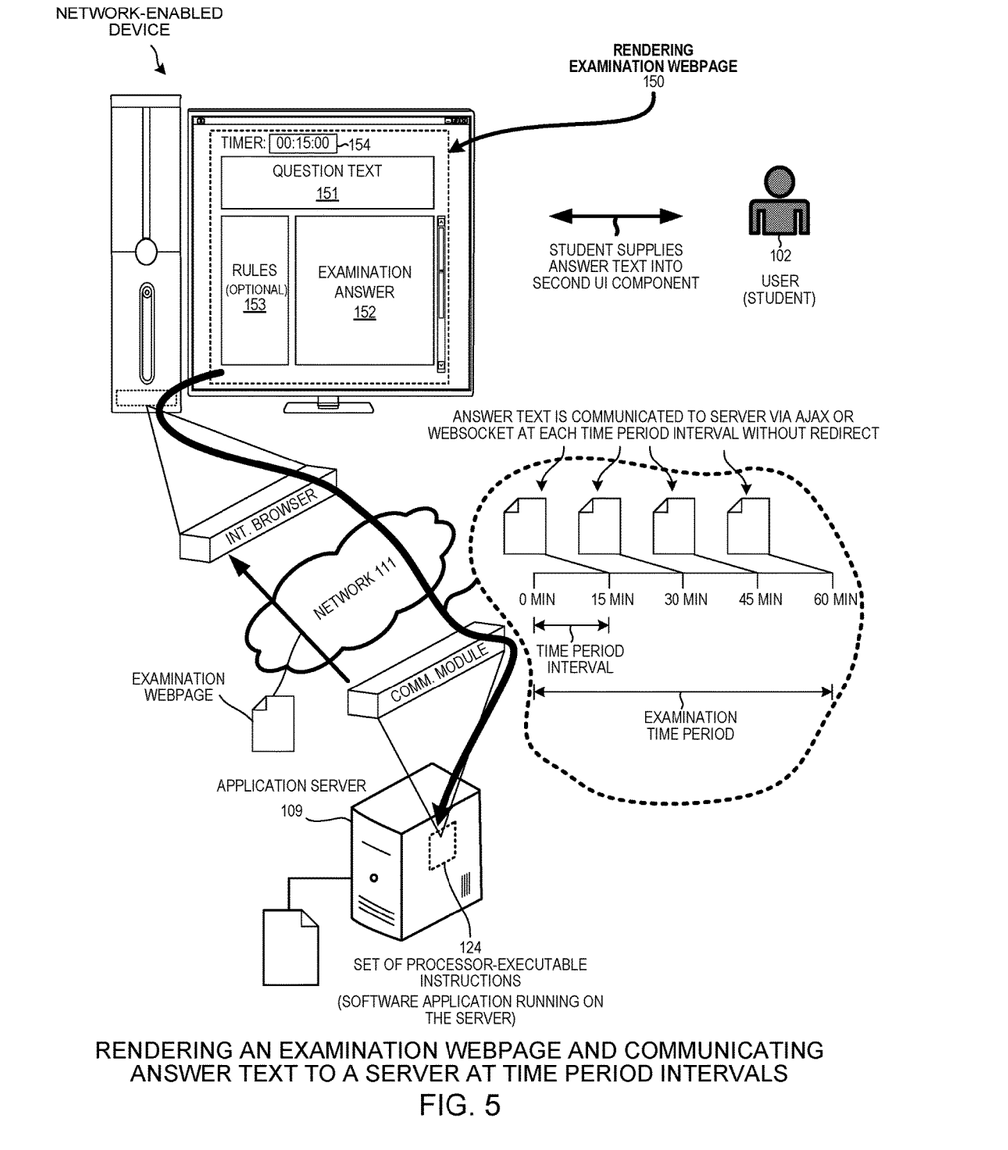
FIG. 5 is a diagram showing rendering of a examination webpage 150 on a network-enabled device of the student 102.

FIG. 5 is a diagram showing rendering of an examination webpage 150 on a network-enabled device of the student 102. The webpage 150 includes a text UI component 151, an editable text UI component 152, and a text UI component 153. The question text in UI component 151 is set by the instructor in the question information component 131. The student 102 supplies the examination answer text into the UI component 152. The rules are optionally shown in UI component 153 in accordance with the configuration information depending on whether the student is in training mode or exam simulation mode. In one example, the examination webpage 150 includes a begin exam button presented as a modal UI component. When the begin exam button is clicked by the student 102, the examination begins. Reference numeral 154 identifies a countdown timer used to indicate how much time is remaining during the testing period. The student 102 types the examination answer into the text UI component 152. The answer text that is stored within the UI component 152 is communicated to the server at a time period interval throughout the examination period. In this example, the configuration information includes a time period interval set to fifteen minutes and an examination time period set to sixty minutes. The answer text is supplied to the web application 109 every fifteen minutes and the web application 109 stores the answer text to present to the user or for further processing.

The answer text is communicated without an HTTP redirect allowing the answer to be stored seamlessly without the student being aware that the essay is being stored periodically throughout the timed writing examination. The communication is plain text or is encapsulated in JSON. In one example, the communication is an asynchronous method call that communicates the answer text encapsulated in JSON to the application server 109 and is handled by the web application 124. The asynchronous call may be realized in a jquery instruction, such as the $.ajax( ) method. In another example, the communication is a websocket communication. The websocket communication is realized via a socket.io method call, such as a socket.on( ) method call or a socket.emit( ) method call available through the socket.io library.

Figure 6:
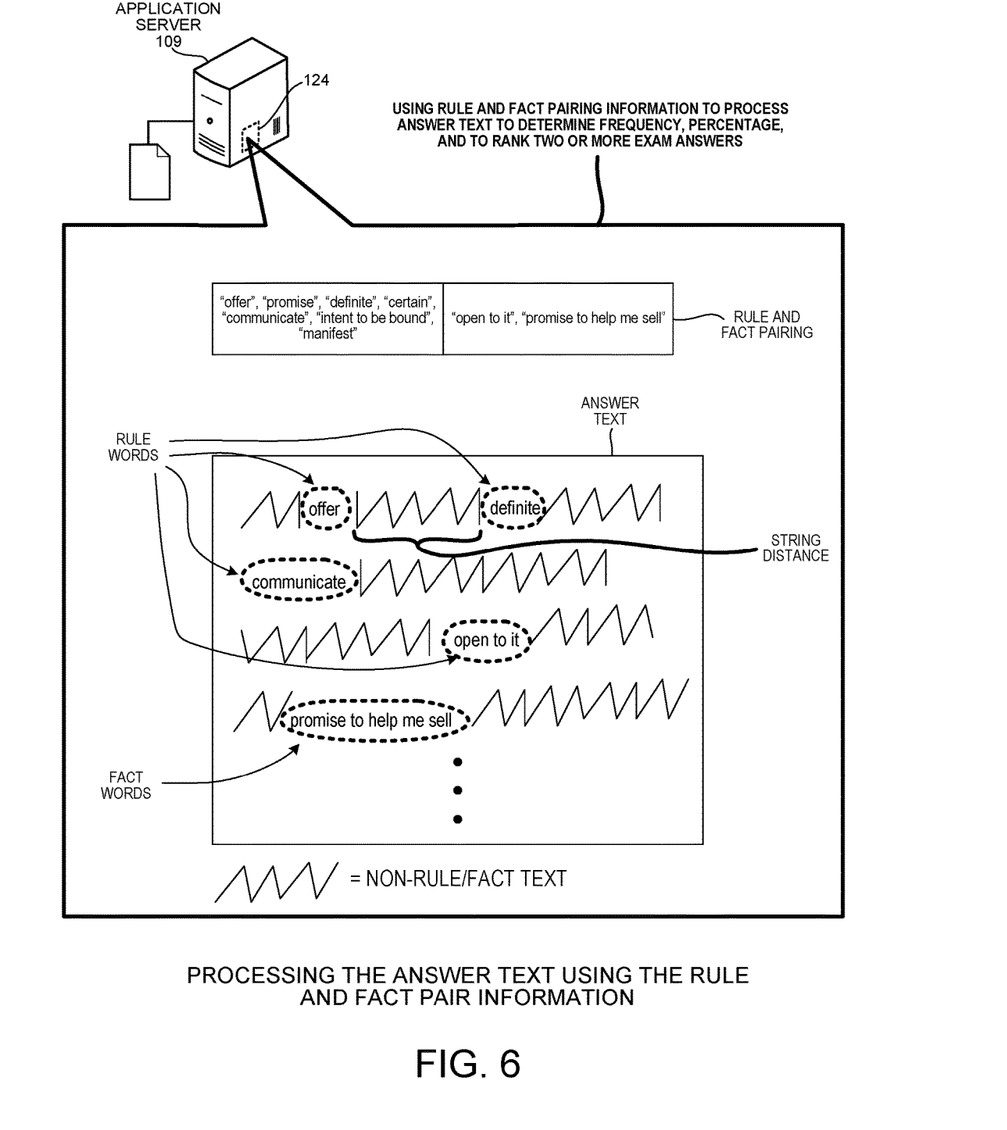
FIG. 6 is a diagram showing how the application performs text processing in order to analyze the exam answer according to the rule and fact pairing information supplied by the instructor.

FIG. 6 is a diagram showing how the application performs text processing in order to analyze the exam answer according to the rule and fact pairing information supplied by the instructor. String distance between rule words and fact words is determined. If the distance between such words is less than a predetermined value, typically within fifteen words, then the rule words and fact words are deemed to be grouped. The predetermined value of acceptable string distance is typically between ten words and sixty words. This is because most effective analysis sections comprise paragraphs having five to eight lines. The string distance processing is performed to determine whether the student used the expected grouping of rule and fact words in the analysis section of a particular issue. Bar exam graders typically look for "buzz words" because they are given a minimal amount of time to review each examination answer. As such, this system aids the instructor in identifying the buzz words. In addition, the student is provided a tool for identifying the buzz words and for assessing how effectively the buzz words are used in the examination answer. Moreover, if the buzz words are present, then the instructor and student are more readily able to focus on other important aspects of legal writing such as the merits of the legal analysis, the persuasiveness of the answer text, diction, and elocution.

In one example, the answer text is processed to determine a frequency the rule and fact pairings appear throughout the answer text. For example, if only a few of the expected rule and fact pairings appear in portions of the answer text, then this would correspond to a low frequency, as compared to an answer text having a greater number of expected rule and fact pairings appearing in portions of the answer text. In another example, a percentage of the number of rule and fact pairings that appear in the answer text is determined. A high percentage indicates that the student's analysis covered each of the important legal issues because the rules were applied to the relevant facts, as expected by the instructor. A low percentage indicates that the student's analysis did not cover the important legal issues or applied the rules to the facts in an incorrect manner.

Figure 7:
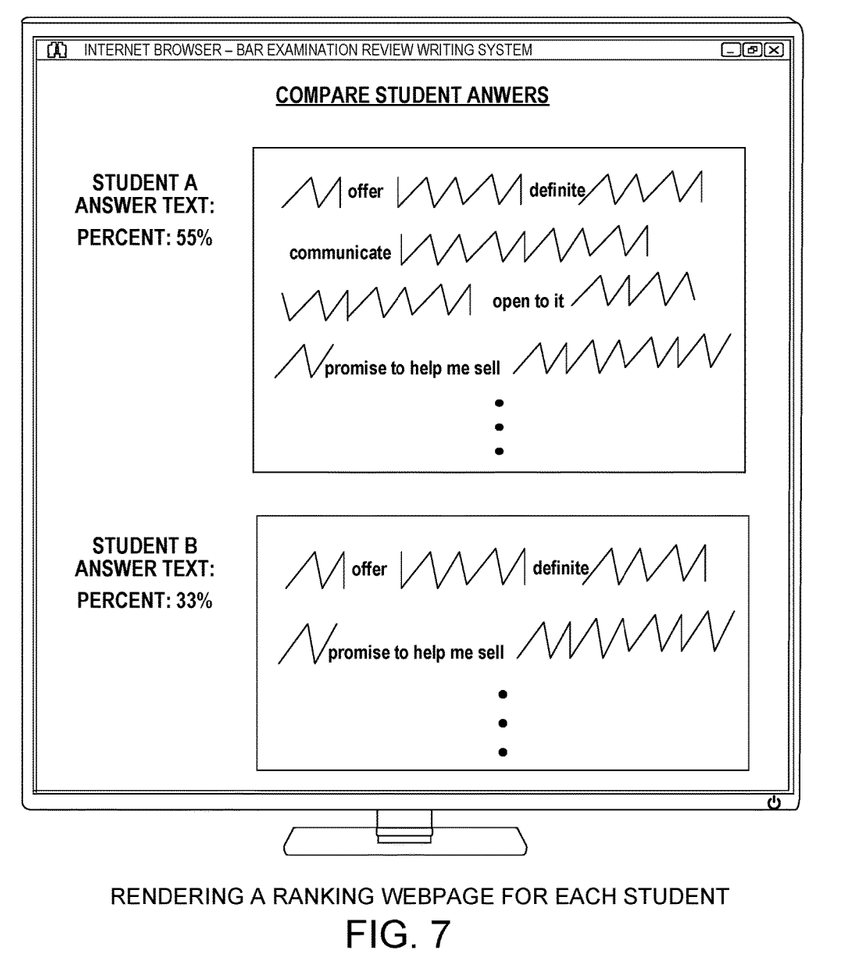
FIG. 7 is a diagram of a ranking webpage generated and provided by the web application 124.

FIG. 7 is a diagram of a ranking webpage generated and provided by the web application 124. The comparison webpage compares examination performance of a plurality of students. In the example of FIG. 7, the examination answer of Student A is compared to the examination answer of Student B. The examination answer texts are compared by using the rule and fact pairing information to process the exam answers, as shown in FIG. 6.

Figure 8:
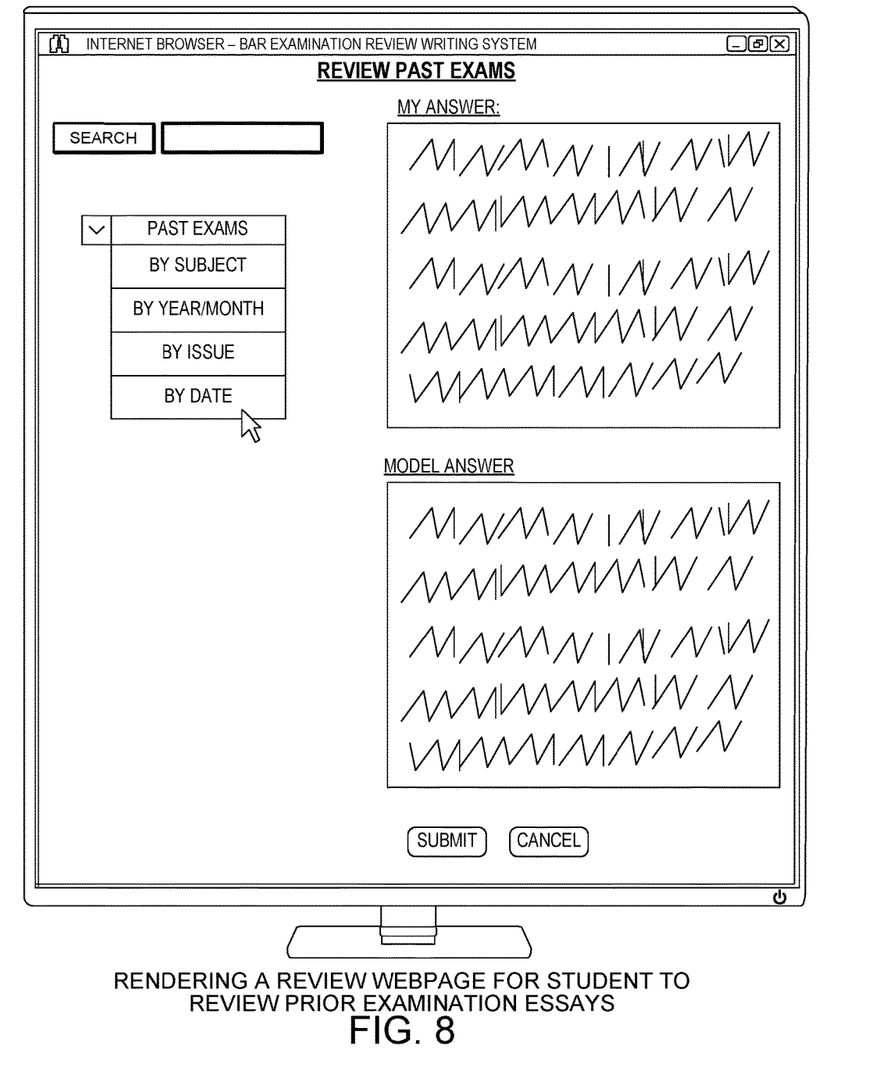
FIG. 8 is a diagram of a review webpage generated and provided by the web application 124.

FIG. 8 is a diagram of a review webpage generated and provided by the web application 124. The student is able to study and prepare for the bar examination by reviewing past examination answers. The student views prior examination answers by searching by subject (for example, "Torts" or "Contracts"), by year or month the examination was administered (for example, "July 2001" or "February 2010"), by issue (for example, "consideration" or "negligence"), or by date the exam was taken. In addition, the student is able to view a past examination answer by the student in tandem with a model answer for the particular examination question. The student may learn how to improve his/her answer, to understand how to apply a rule to a particular set of facts, to improve rule statements, or to gain an improved understanding of how issues arise in a set of facts.

Figure 9:
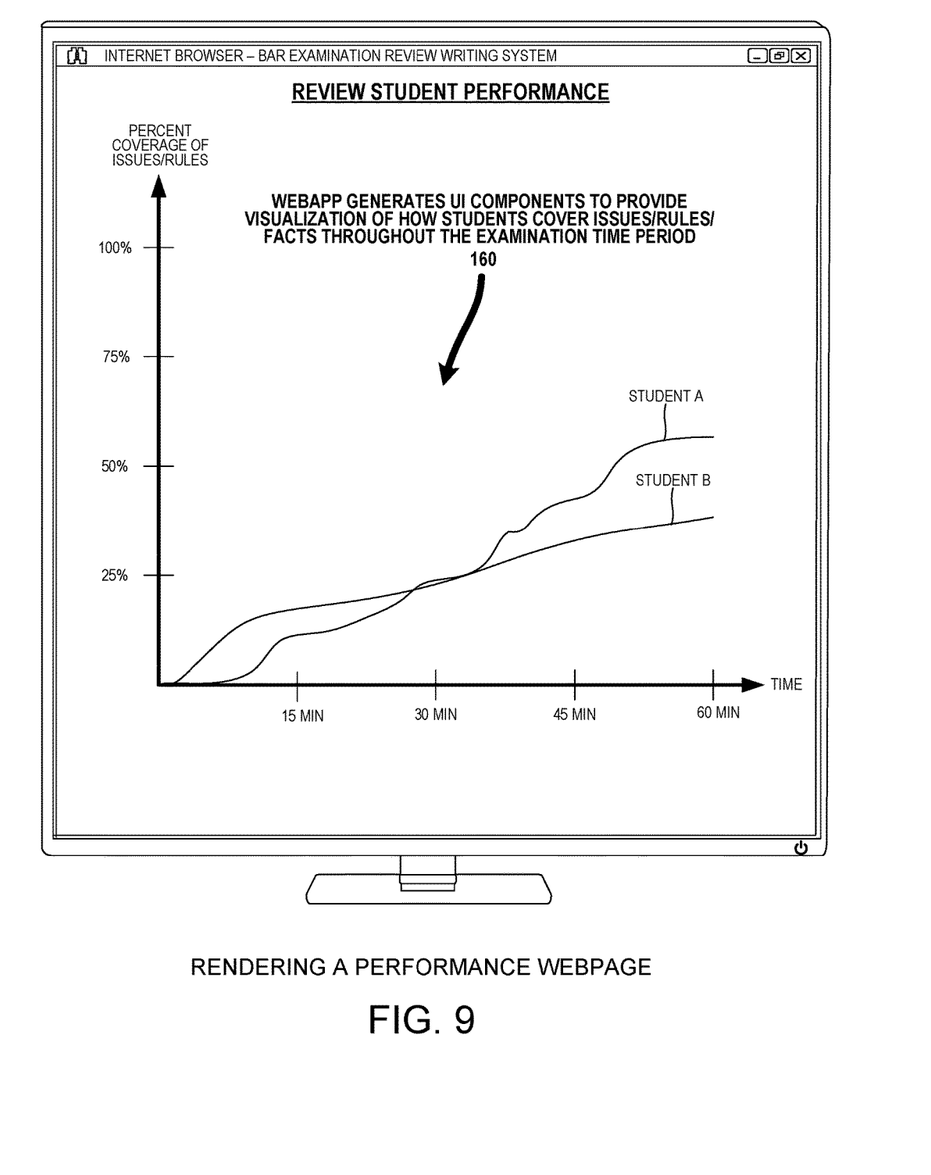
FIG. 9 is a diagram of a performance webpage generated and provided by the web application 124.

FIG. 9 is a diagram of a performance webpage generated and provided by the web application 124. In this example, the student and instructor is able to visualize how effectively the student uses the limited examination time period. The student only obtains points for applying the proper rules to a proper set of facts that appear in the question. Graph 160 shows the percentage of rules and fact pairings that are supplied by the student throughout the examination time period. The web application 124 determined that Student A discussed approximately 55% of the issues and rules associated with the essay during the examination time period. The web application 124 determined that Student B discussed approximately 40% of the issues and rules associated with the essay during the examination time period. In this example, the time interval period is at most one minute thereby providing a high resolution. In another example, the interval period is fifteen minutes thereby providing a low resolution and instead of a linear graph, graph 160 is rendered as bar chart having four sets of data points for a sixty minute exam.

Figure 10:
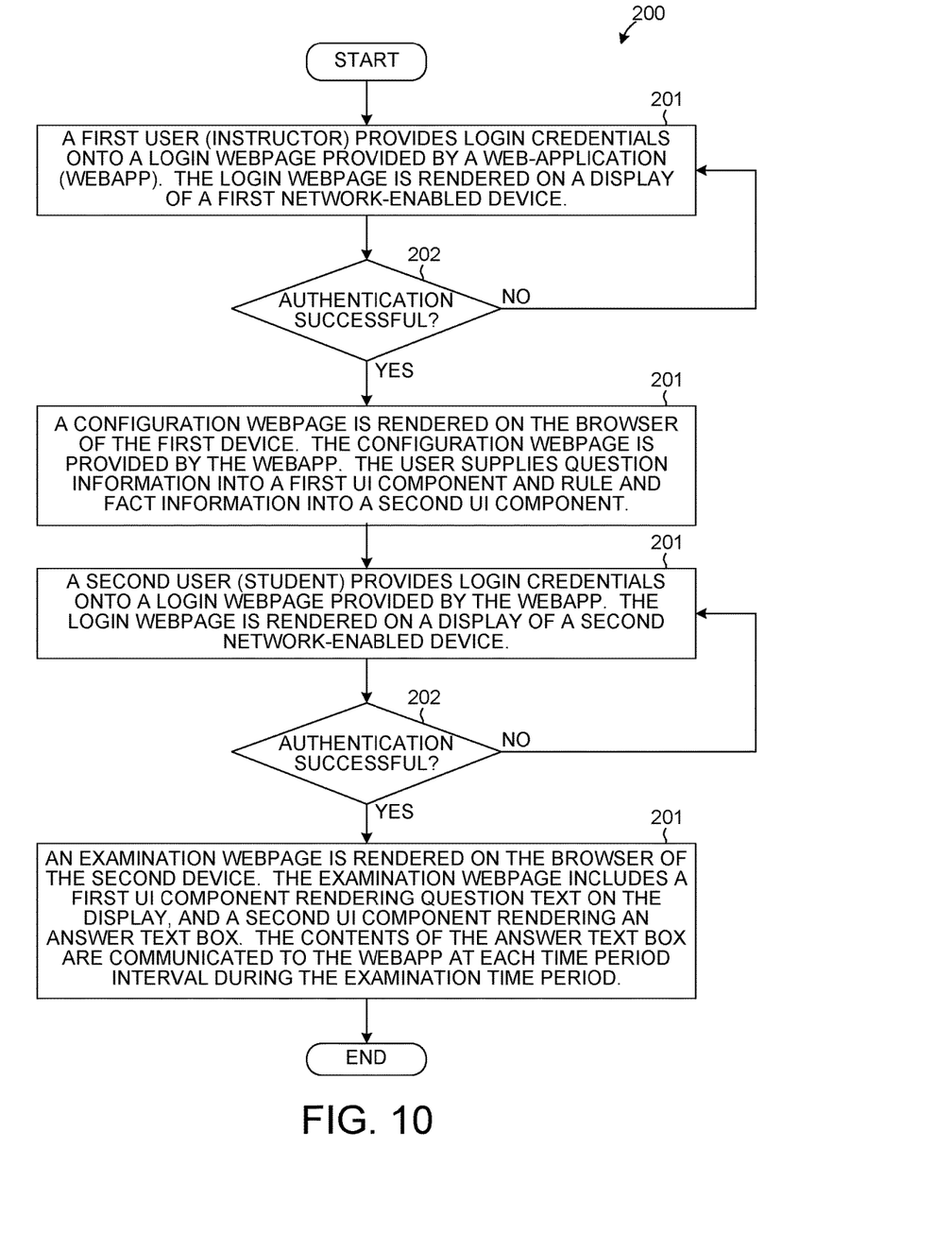
FIG. 10 is a diagram of a flowchart of a method 200 in accordance with one novel aspect.

FIG. 10 is a diagram of a flowchart of a method 200 in accordance with one novel aspect.

Although the present invention has been described in connection with certain specific embodiments for instructional purposes, the present invention is not limited thereto. In the example of FIG. 5, the answer is stored at periodic intervals, however, in another example, the answer text is communicated in a websocket and the instructor is provided a webpage that renders the answer text in real-time. Moreover, the instructor may see answer text for each student taking the examination in real-time in a single webpage. In another example, the web application 124 is a Single Page Application (SPA) such that each user accesses a single webpage and is provided every feature of above examples on the single webpage without ever redirecting to another webpage. Accordingly, various modifications, adaptations, and combinations of various features of the described embodiments can be practiced without departing from the scope of the invention as set forth in the claims.

What is claimed is:

1. A method comprising:
   (a) authenticating a first user by receiving a first set of login credentials onto an examination system, wherein the first user provides the first set of login credentials onto a first login webpage presented on a first web browser, wherein the first login webpage has a plurality of User Interface (UI) components onto which the first user supplies the first set of login credentials, and wherein the first user is registered with the examination system;
   (b) configuring examination sessions using configuration information provided by the first user through the web browser, wherein the configuration information comprises question information, rule and fact pair information, an examination time limit, and a time interval save period, wherein the configuration information is provided via a configuration webpage that includes a plurality of UI components, wherein a first of the plurality of UI components receives the question information, and wherein a second of the plurality of UI components receives the rule and fact pair information;
   (c) authenticating a second user by receiving a second set of login credentials onto the examination system, wherein the second user provides the second set of login credentials onto a second login webpage presented on a second web browser, wherein the second login webpage has a plurality of UI components onto which the second user supplies the second set of login credentials, and wherein the second user is registered with the examination system;
   (d) presenting a first examination session to the second user via a first examination webpage presented on the second web browser, wherein the first examination webpage includes a plurality of UI components, wherein a first of the plurality of UI components includes question text, wherein the question text is generated from the question information received in (b), and wherein a second of the plurality of UI components receives answer text;
   (e) receiving answer text from the first examination webpage presented on the second web browser onto the examination system in accordance with the time interval save period configured in (b), wherein answer text is provided by the second user supplying input to the examination answer component presented in (d);
   (f) authenticating a third user by receiving a third set of login credentials onto the examination system, wherein the third user provides the third set of login credentials onto a third login webpage presented on a third web browser, wherein the third login webpage has a plurality of UI components onto which the third user supplies the third set of login credentials, and wherein the third user is registered with the examination system;
   (g) presenting a second examination session to the third user via a second examination webpage presented on the third web browser, wherein the second examination webpage includes a plurality of UI components, wherein a first of the plurality of UI components includes question text, wherein the question text is generated from the question information received in (b), and wherein a second of the plurality of UI components receives answer text;
   (h) receiving answer text from the second examination webpage presented on the third web browser onto the examination system in accordance with the time interval save period configured in (b), wherein the answer text is provided by the third user supplying input to the examination answer component presented in (g);
   (i) processing answer text received in (e) and (h) on the examination system by using rule and fact pair information received in (b), wherein the processing involves determining amount of times words of the rule and fact pair information appear in answer text; and
   (j) presenting a comparison of the first examination session and the second examination session processed in (i) to the first user, wherein the comparison is presented on a single page on the first web browser, and wherein the comparison of (j) indicates whether the second user used more words of the rule and fact pair information than the third user.

2. The method of claim 1, wherein the comparison presented in (j) is a first percentage value of the second user and a second percentage value of the third user, wherein the first percentage value and the second percentage value are shown on the single page.

3. The method of claim 1, wherein the comparison presented in (j) is a plot that shows the amount of times words of the rule and fact pair information appear in answer text of the second user during the examination time limit, and wherein the plot also shows the amount of times words of the rule and fact pair information appear in answer text of the third user during the examination time limit.

4. The method of claim 1, wherein the presenting of (d) and the presenting of (g) occur simultaneously.

5. The method of claim 1, wherein the receiving of (e) and the receiving of (h) occur simultaneously.

\* \* \* \* \*